(12) United States Patent
Wang et al.

(10) Patent No.: US 12,487,353 B2
(45) Date of Patent: Dec. 2, 2025

(54) GUARDRAIL ESTIMATION METHOD BASED ON MULTI-SENSOR DATA FUSION, AND VEHICLE-MOUNTED DEVICE

(71) Applicant: UISEE (SHANGHAI) AUTOMOTIVE TECHNOLOGIES LTD, Shanghai (CN)

(72) Inventors: Zihan Wang, Shanghai (CN); Lingxia Ye, Shanghai (CN)

(73) Assignee: UISEE (SHANGHAI) AUTOMOTIVE TECHNOLOGIES LTD, Shanghai (CN)

( * ) Notice: Subject to any disclaimer, the term of this patent is extended or adjusted under 35 U.S.C. 154(b) by 752 days.

(21) Appl. No.: 17/916,038

(22) PCT Filed: Nov. 22, 2019

(86) PCT No.: PCT/CN2019/120407
§ 371 (c)(1),
(2) Date: Sep. 30, 2022

(87) PCT Pub. No.: WO2021/097844
PCT Pub. Date: May 27, 2021

(65) Prior Publication Data
US 2023/0168368 A1    Jun. 1, 2023

(51) Int. Cl.
*G01S 13/931* (2020.01)
*G01S 13/86* (2006.01)

(52) U.S. Cl.
CPC .......... *G01S 13/931* (2013.01); *G01S 13/862* (2013.01); *G01S 13/867* (2013.01); *G01S 2013/9318* (2020.01); *G01S 2013/932* (2020.01)

(58) Field of Classification Search
CPC ....... G01S 13/86–872; G01S 15/86–87; G01S 17/86–87; G01S 13/931; G01S 17/931;
(Continued)

(56) References Cited

U.S. PATENT DOCUMENTS

2007/0143004 A1* 6/2007 Sakuma .................. G01S 7/412
73/146
2015/0293216 A1   10/2015 O'Dea et al.
2017/0329000 A1* 11/2017 Masui .................... B60W 30/16

FOREIGN PATENT DOCUMENTS

CN    103786729 A    5/2014
CN    107250840 A    10/2017
(Continued)

OTHER PUBLICATIONS

KR102022539 Translation (Year: 2019).*
WO2010/127650 A1 translation (Year: 2010).*

*Primary Examiner* — Matthew M Barker
(74) *Attorney, Agent, or Firm* — Bayramoglu Law Offices LLC (57) ABSTRACT

A guardrail estimation method based on multi-sensor data fusion is provided. The guardrail estimation method comprises acquiring multi-sensor data and vehicle information, determining a traveling track of the vehicle based on the vehicle information, determining multiple guardrail sample points based on the multi-sensor data and the traveling track, and estimating guardrail information based on the multiple guardrail sample points. When the vehicle is controlled laterally, the guardrail information is used for correcting a lane line of poor quality; and when the lane line cannot be detected, the guardrail information is used for a lateral control downgrade processing, and the guardrail information also facilitates aided realization of fast and accurate expressway lane-level localization and realization of a higher-level aided driving function.

15 Claims, 3 Drawing Sheets

(58) Field of Classification Search
CPC ........... G01S 15/931; G01S 2013/9318; G01S 2013/932
See application file for complete search history.

(56) References Cited

FOREIGN PATENT DOCUMENTS

| | | | | |
|---|---|---|---|---|
| CN | 107667047 | A | 2/2018 | |
| CN | 108297795 | A | 7/2018 | |
| CN | 108344997 | A | 7/2018 | |
| CN | 108974007 | A | 12/2018 | |
| CN | 109249928 | A | 1/2019 | |
| CN | 109254289 | A | 1/2019 | |
| KR | 102022539 | B1 * | 9/2019 | |
| WO | WO-2010127650 | A1 * | 11/2010 | ........... G01S 13/867 |

* cited by examiner

GUARDRAIL ESTIMATION METHOD BASED ON MULTI-SENSOR DATA FUSION, AND VEHICLE-MOUNTED DEVICE

CROSS REFERENCES TO THE RELATED APPLICATIONS

This application is a national phase of International Patent Application No. PCT/CN2019/120407 filed on Nov. 22, 2019. The disclosure of the aforementioned application is hereby incorporated by reference in its entirety.

TECHNICAL FIELD

The embodiments of the present disclosure relate to the technical field of smart driving, and more particularly, to a guardrail estimation method based on multi-sensor data fusion, a vehicle-mounted device, and a storage medium.

BACKGROUND

With the development of smart driving technologies, the first scene to realize advanced aided driving and semi-automatic driving is expressway, which has relatively simple working conditions, good lane line quality and easy realization.

The control fields of aided driving may be roughly divided into lateral control and longitudinal control. The lateral control is mainly based on a lane line, which keeps a controlled vehicle in a center of the lane. In mass-produced vehicles with aided driving function nowadays, cameras and millimeter-wave radars are used as main perceptive sensors, and the perception of the lane lines depends on the cameras. Only relying on the camera to sense the lane lines as the basis of the lateral control will lead to the deterioration of system performances and stability.

Therefore, it is urgent to provide a guardrail estimation solution to obtain guardrail information, which may be used as a supplement to the lane lines to improve the performances of the lateral control from different data sources.

The description of the discovery process of the above problems is only used to assist in understanding the technical solutions of the present disclosure, and does not represent an admission that the above contents belong to the prior art.

SUMMARY

In order to solve at least one problem of the prior art, at least one embodiment of the present disclosure provides a guardrail estimation method based on multi-sensor data fusion, a vehicle-mounted device, and a storage medium.

In a first aspect, the embodiments of the present disclosure provide a guardrail estimation method based on multi-sensor data fusion. The method includes:

acquiring multi-sensor data and vehicle information;
determining a traveling track of the vehicle based on the vehicle information;
determining multiple guardrail sample points based on the multi-sensor data and the traveling track; and
estimating guardrail information based on the multiple guardrail sample points.

In a second aspect, the embodiments of the present disclosure also provide a vehicle-mounted device, including: a processor and a memory; the processor being configured for executing the steps of the method according to the first aspect by calling a program or instruction stored in the memory.

In a third aspect, the embodiments of the present disclosure also provide a non-transient computer-readable storage medium for storing a program or instruction, and the program or instruction enables a computer to execute the steps of the method according to the first aspect.

It can be seen that in at least one of the embodiments of the present disclosure, when the vehicle is controlled laterally, the guardrail information is used for correcting a lane line of poor quality; and when the lane line cannot be detected, the guardrail information is used for lateral control downgrade processing, and meanwhile, the guardrail information also facilitates aided realization of fast and accurate expressway lane-level localization, and realization of a higher-level aided driving function.

BRIEF DESCRIPTION OF THE DRAWINGS

In order to illustrate the technical solutions in the embodiments of the present disclosure more clearly, the accompanying drawings used in the description of the embodiments or the prior art will be briefly described below. Obviously, the accompanying drawings in the following description are merely some embodiments of the present disclosure. Those of ordinary skills in the art can also obtain other accompanying drawings according to these accompanying drawings.

DETAILED DESCRIPTION OF THE EMBODIMENTS

In order to make the above objects, features and advantages of the present disclosure be more clearly understood, the present disclosure will be described in further detail below with reference to the drawings and embodiments. It may be understood that the described embodiments are merely a part of, rather than all of, the embodiments of the present disclosure. The specific embodiments described herein are merely illustrative of the present disclosure and are not intended to limit the present disclosure. Based on the embodiments of the present disclosure described, all the other embodiments obtained by a person of ordinary skills in the art shall fall within the scope of protection of the present disclosure.

It should be noted that relational terms herein such as "first" and "second" and the like, are used merely to distinguish one entity or operation from another entity or operation, and do not necessarily require or imply there is any such relationship or order between these entities or operations.

Aiming at the problem that perception of lane lines depends on cameras in the prior art, and only relying on the cameras to perceive the lane lines as the basis of lateral control will lead to deterioration of system performances and stability, the embodiments of the present disclosure provide a guardrail estimation solution based on multi-sensor data fusion, which, in the case that an expressway has a guardrail, can stably output whether the guardrail exists and estimate a shape of the guardrail, so that the guardrail information is used for correcting the lane line with poor quality when the vehicle is controlled laterally; when the lane line cannot be detected, the guardrail information is used for lateral control downgrade processing, and meanwhile, the guardrail information also facilitates aided realization of fast and accurate expressway lane-level localization, and realization of a higher-level aided driving function.

Figure 1:
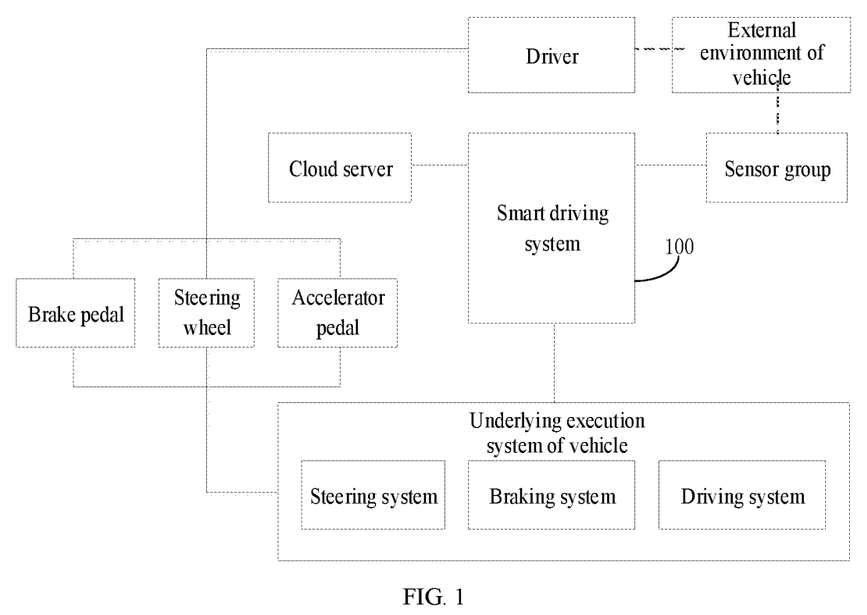
FIG. 1 is an overall architecture diagram of a smart driving vehicle provided by an embodiment of the present disclosure.

In some embodiments, the guardrail estimation solution based on multi-sensor data fusion provided by the embodiments of the present disclosure may be applied to a smart driving vehicle. FIG. 1 is an overall architecture diagram of a smart driving vehicle provided by an embodiment of the present disclosure.

As shown in FIG. 1, the smart driving vehicle includes: a sensor group, a smart driving system 100, an underlying execution system of the vehicle, and other components that may be used to drive the vehicle and control the operation of the vehicle.

The sensor group is used to collect data of an external environment of the vehicle and detecting position data of the vehicle. The sensor group, for example, includes, but is not limited to at least one of a camera, a laser radar, a millimeter-wave radar, an ultrasonic radar, a GPS (Global Positioning System) and an IMU (Inertial Measurement Unit).

In some embodiments, the sensor group is also used to collect kinetic data of the vehicle. For example, the sensor group further includes, but is not limited to, at least one of a wheel speed sensor, a speed sensor, an acceleration sensor, a steering wheel angle sensor and a front wheel angle sensor.

The smart driving system 100 is used to acquire the data of the sensor group, and all the sensors in the sensor group transmit data at a high frequency during the driving of the smart driving vehicle.

The smart driving system 100 is further used to conduct environmental sensing and vehicle localization based on the data of the sensor group, perform path planning and decision making based on environmental perception information and vehicle localization information, and generate a vehicle control instruction based on the planned path, so as to control the vehicle to drive along the planned path.

In some embodiments, the smart driving system 100 is further used to perform guardrail estimation based on multi-sensor data fusion to obtain guardrail information. In some embodiments, the smart driving system 100 acquires multi-sensor data and vehicle information; and then determines a traveling track of the vehicle based on the vehicle information; thus, determining multiple guardrail sample points based on the multi-sensor data and the traveling track; and estimating guardrail information based on the multiple guardrail sample points.

In some embodiments, the smart driving system 100 may be a software system, a hardware system or a system combining hardware and software. For example, the smart driving system 100 is a software system running on an operating system, and a vehicle-mounted hardware system is a hardware system that supports the operation of the operating system.

In some embodiments, the smart driving system 100 is also used to wirelessly communicate with a cloud server and exchange a variety of information. In some embodiments, the smart driving system 100 communicates wirelessly with the cloud server through a wireless communication network, for example, including, but not limited to a GPRS (General Packet Radio Service) network, a Zigbee network, a Wi-Fi network, a 3G (third-generation) network, a 4G (fourth-generation) network, a 5G (fifth-generation) network, and the like.

In some embodiments, the cloud server is used to coordinate and manage the smart driving vehicle. In some embodiments, the cloud server may be used to interact with one or more smart driving vehicles, coordinate and manage the scheduling of multiple smart driving vehicles, and the like.

In some embodiments, the cloud server is a cloud server established by a vehicle service provider, which provides cloud storage and cloud computing functions. In some embodiments, a vehicle-side file is established in the cloud server. In some embodiments, the vehicle-side file stores a variety of information uploaded by the smart driving system 100. In some embodiments, the cloud server can synchronize driving data generated at the vehicle side in real time.

In some embodiments, the cloud server may be a server or a server group. The server group may be centralized or distributed. The distributed server is conducive to the distribution and optimization of tasks among multiple distributed servers, overcoming the shortage of resources and the bottleneck of response of traditional centralized servers. In some embodiments, the cloud server may be local or remote.

In some embodiments, the cloud server may be used to charge parking fees and tolls from the vehicle side. In some embodiments, the cloud server is also used to analyze a driving behavior of a driver and evaluate a safety level of the driving behavior of the driver.

In some embodiments, the cloud server may be used to obtain information of a road monitoring unit (Road Side Unit, RSU) and the smart driving vehicle, and may send information to the smart driving vehicle. In some embodiments, the cloud server may send detection information corresponding to the smart driving vehicle in the road monitoring unit to the smart driving vehicle according to the information of the smart driving vehicle.

In some embodiments, the road monitoring unit may be used to collect road monitoring information. In some embodiments, the road monitoring unit may be an environmental perception sensor, such as a camera, a laser radar, and the like, or a road device, such as a V2X (Vehicle to everything) device, a roadside traffic light apparatus, and the like. In some embodiments, the road monitoring unit may monitor road conditions belonging to the corresponding road monitoring unit, for example, a type, a speed, a priority level, and the like, of a passing vehicle. After collecting the road monitoring information, the road monitoring unit may send the road monitoring information to the cloud server or to a smart driving vehicle passing through the road.

The underlying execution system of the vehicle is used to receive the vehicle control instruction and control the running of the vehicle. In some embodiments, the underlying execution system of the vehicle includes, but is not limited to: a steering system, a braking system and a driving system.

The steering system, the braking system and the driving system are mature systems in the field of vehicles, and will not be elaborated herein.

In some embodiments, the smart driving vehicle may also include a vehicle CAN bus, which is not shown in FIG. 1, and the vehicle CAN (Controller Area Network) bus is connected with the underlying execution system of the vehicle. Information exchange between the smart driving system 100 and the underlying execution system of the vehicle is transmitted through the vehicle CAN bus.

In some embodiments, the smart driving vehicle may be controlled to run by both the driver and the smart driving system 100. In a manual driving mode, the driver drives the vehicle by operating an apparatus that controls the running of the vehicle. The apparatus that controls the running of the vehicle, for example, includes, but is not limited to a brake pedal, a steering wheel and an accelerator pedal. The apparatus that controls the running of the vehicle may directly operate the underlying execution system of the vehicle to control the running of the vehicle.

In some embodiments, the smart driving vehicle may also be an unmanned vehicle, and the driving control of the vehicle is performed by the smart driving system 100.

Figure 2:
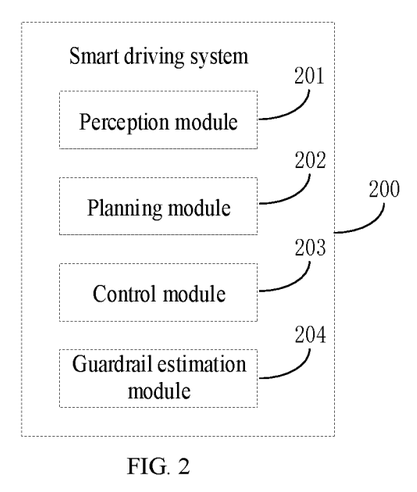
FIG. 2 is a block diagram of a smart driving system provided by an embodiment of the present disclosure.

FIG. 2 is a block diagram of a smart driving system 200 provided by an embodiment of the present disclosure. In some embodiments, the smart driving system 200 may be implemented as the smart driving system 100 in FIG. 1 or a part of the smart driving system 100, and is used to control the running of the vehicle.

As shown in FIG. 2, the smart driving system 200 may be divided into a plurality of modules, for example, may include: a perception module 201, a planning module 202, a control module 203, a guardrail estimation module 204 and some other modules used for smart driving.

The perception module 201 is used for environmental perception and localization. In some embodiments, the perception module 201 is used to acquire sensor data, V2X (Vehicle to everything) data, high-precision maps and other data. In some embodiments, the perception module 201 is used to perform environmental perception and localization based on at least one of the acquired sensor data, V2X (Vehicle to everything) data, high-precision maps and other data.

In some embodiments, the perception module 201 is used to generate perception and localization information to realize the perception of obstacles, the recognition of a travelable area of a camera image, the localization of the vehicle, and the like.

Environmental Perception can be understood as an ability to understand a scene of the environment, for example, semantic classification of data such as the position of obstacles, the detection of road signs/markers, and the detection of pedestrians/vehicles. In some embodiments, environmental perception may be carried out by using data of multiple sensors such as a camera, a laser radar, a millimeter-wave radar, and the like.

Localization is a part of perception, which is an ability to determine a position of the smart driving vehicle relative to the environment. GPS localization may be used for localization, wherein a localization accuracy of GPS is in a level of tens of meters to centimeters, and the localization accuracy is high. A localization method that integrates GPS and Inertial Navigation System may also be used for localization. SLAM (Synchronous Localization and Mapping) may also be used for localization. A target of SLAM is to build a map and simultaneously use the map for localization. SLAM uses an observed environmental feature to determine a current position of the vehicle and a current position of the observed feature.

V2 is a key technology of a smart transportation system, which enables vehicles to vehicles, vehicles to base stations, and base stations to base stations to communicate with each other, so as to obtain a series of traffic information such as real-time road conditions, road information, pedestrian information, or the like, to improve a smart driving safety, reduce congestion, improve a traffic efficiency, and provide vehicle-mounted entertainment information.

A high-precision map is a geographic map used in the field of smart driving. Compared with traditional maps, the high-precision map is different in the following aspects: 1) the high-precision map includes a large amount of driving assistance information, such as accurate three-dimensional representation depended on road networks, including intersections and road sign positions; 2) the high-precision map further includes a large amount of semantic information, such as reporting the meanings of different colors on traffic lights, indicating a speed limit of a road, and a starting position of a left-turn lane; and 3) the high-precision map can achieve centimeter-level precision to ensure the safe driving of the smart driving vehicle.

The planning module 202 is used to perform path planning and decision making based on the perception and localization information generated by the perception module 201.

In some embodiments, the planning module 201 is used to perform path planning and decision making based on the perception and localization information generated by the perception module 201 and with reference to at least one of the V2X data, the high-precision maps and other data.

In some embodiments, the planning module 202 is used to perform path planning and make decisions on behaviors (for example, including, but not limited to following, overtaking, parking, bypassing, and the like), vehicle heading, vehicle speed, expected acceleration of the vehicle, expected steering wheel angle, and the like, and generate planning and decision making information.

The control module 203 is used to perform path tracing and track tracing based on the planning and decision making information generated by the planning module 202.

In some embodiments, the control module 203 is used to generate a control instruction of the underlying execution system of the vehicle, and issue the control instruction, so that the underlying execution system of the vehicle can control the vehicle to drive along a desired path, for example, the vehicle is controlled horizontally and longitudinally by controlling the steering wheel, a brake and an accelerator.

In some embodiments, the control module 203 is also used to calculate a front wheel angle based on a path tracing algorithm.

In some embodiments, an expected path curve in the path tracing process is irrelevant to a time parameter. During tracing control, it may be assumed that the smart driving vehicle is moving at a constant speed at the current speed, and a driving path approaches the expected path with a certain cost rule. In track tracing, the expected path curve is related to both time and space, and the smart driving vehicle is required to arrive at a preset reference path point within a specified time.

Different from the track tracing, the path tracing is not restrained by time, and it is only desirable to trace the expected path within a certain error scope.

The guardrail estimation module 204 is used to perform guardrail estimation based on multi-sensor data fusion to obtain guardrail information. In some embodiments, the guardrail estimation module 204 acquires multi-sensor data and vehicle information; then determines a traveling track of the vehicle based on the vehicle information; thus, determining multiple guardrail sample points based on the multi-sensor data and the traveling track; and estimating guardrail information based on the multiple guardrail sample points.

In some embodiments, functions of the guardrail estimation module 204 may be integrated into the perception module 201, the planning module 202 or the control module 203, or may also be configured as an independent module from the smart driving system 200. The guardrail estimation module 204 may be a software module, a hardware module or a module integrating software and hardware. For example, the guardrail estimation module 204 is a software system running on an operating system, and a vehicle-mounted hardware system is a hardware system that supports the operation of the operating system.

Figure 3:
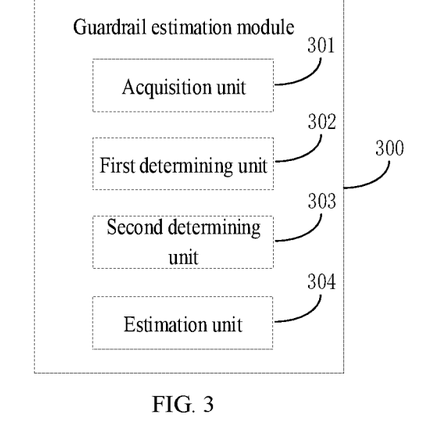
FIG. 3 is a block diagram of a guardrail estimation module provided by an embodiment of the present disclosure.

FIG. 3 is a block diagram of a guardrail estimation module 300 provided by an embodiment of the present disclosure. In some embodiments, the guardrail estimation module 300 may be implemented as the guardrail estimation module 204 or a part of the guardrail estimation module 204 in FIG. 2.

As shown in FIG. 3, the guardrail estimation module 300 may include, but is not limited to the following units: an acquisition unit 301, a first determining unit 302, a second determining unit 303 and an estimation unit 304.

The acquisition unit 301 is used to acquire multi-sensor data and vehicle information. In some embodiments, multi-sensors are arranged on the vehicle, which are at least used for realizing forward detection and lateral detection of the vehicle. In some embodiments, the multi-sensors may include, but are not limited to: a Millimeter-Wave Radar, a visual sensor and an Ultrasonic Radar. The visual sensor is, for example, a Camera. The millimeter-wave radar and the visual sensor realize the forward detection, while the ultrasonic radar realizes the lateral detection of the vehicle.

Figure 6:
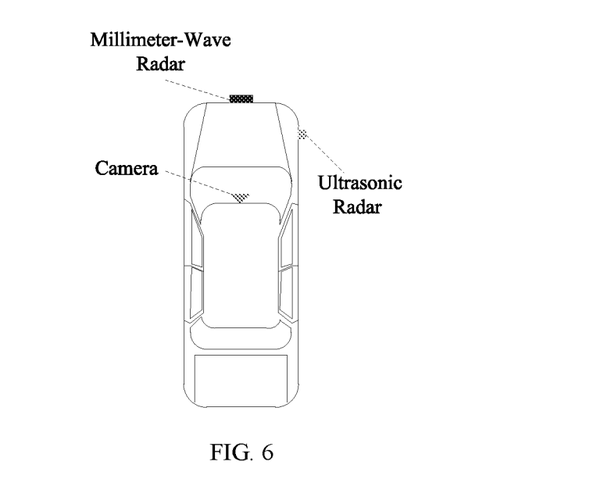
FIG. 6 is a schematic diagram of a multi-sensor arrangement provided by an embodiment of the present disclosure.

In some embodiments, the arrangement of the multi-sensors is shown in FIG. 6. In FIG. 6, the Millimeter-Wave Radar is arranged on a front bumper of the vehicle, the Camera is arranged directly above a front windshield of the vehicle, and the Ultrasonic Radar is arranged on a right front side of the vehicle. Those skilled in the art can understand that the arrangement of the multi-sensors is not limited to the arrangement shown in FIG. 6, and there may be other ways, for example, the Ultrasonic Radar is also arranged on a left front side of the vehicle. This embodiment does not limit the specific arrangements of the multi-sensors, nor the specific installation positions of the multi-sensors, nor the specific types of the multi-sensors.

In some embodiments, the millimeter-wave radar data at least includes point information or track information of a moving object or a stationary object, wherein the point information at least includes a range, an azimuth, a range rate and a radar cross section of a detection target. The track information at least includes a Range, a Range Rate, an Angle and a Radar Cross Section (RCS).

In some embodiments, the visual sensor data is at least used to identify a travelable area, and then a boundary point of the travelable area can be determined, so as to obtain position information and category information of the boundary point of the travelable area. The position information includes a horizontal position and a longitudinal position. The horizontal direction may be understood as a horizontal direction of the vehicle, and the longitudinal direction may be understood as a longitudinal direction of the vehicle. The category information includes: guardrail and non-guardrail.

In some embodiments, the ultrasonic radar data at least includes a range of the nearest target detected. In the case that a relative speed is less than or equal to 80 kilometers per hour, guardrails within 3 meters can be detected.

In some embodiments, the vehicle information is at least used to calculate a traveling track of the vehicle and perform guardrail tracing. In some embodiments, the vehicle information may include, but is not limited to: a vehicle speed, a yaw rate and a steering wheel angle.

The first determining unit 302 is used to determine the traveling track of the vehicle based on the vehicle information. In some embodiments, the first determining unit 302 determines a steering radius of the vehicle based on the vehicle information; and then, determines the traveling track of the vehicle based on the steering radius. In some embodiments, the first determining unit 302 determines the steering radius of the vehicle in two cases: calculating based on the steering wheel angle and a predetermined vehicle tread at a low speed; and calculating based on the vehicle speed and the yaw rate at a high speed. In some embodiments, if the vehicle speed is less than a preset vehicle speed, the first determining unit 302 determines the steering radius of the vehicle based on the steering wheel angle and the vehicle tread; and if the vehicle speed is not less than the preset vehicle speed, determines the steering radius of the vehicle based on the vehicle speed and the yaw rate.

In some embodiments, if the vehicle speed is not less than the preset vehicle speed, the first determining unit 302 determines the steering radius of the vehicle through the following formula:

$$R = \frac{v_x}{\omega}$$

$$v_x \geq v_{th}$$

If the vehicle speed is less than the preset vehicle speed, the first determining unit 302 determines the steering radius of the vehicle through the following formula:

$$R = \frac{L}{\sin(\delta_f)}$$

$$v_x < v_{th}$$

wherein, $v_x$ is the vehicle speed, which may also be understood as a longitudinal speed of the vehicle, in the unit of meters per second (m/s); $\omega$ is the yaw rate, in the unit of rad/s; R is the steering radius of the vehicle, which may also be understood as a transient steering radius of the vehicle; L is the vehicle tread; $\delta_f$ is the front wheel angle, and the front wheel angle is calculated based on the steering wheel angle; $v_{th}$ is the preset vehicle speed, and those skilled in the art may set $v_{th}$ according to actual needs. This embodiment does not limit the specific value of $v_{th}$.

The second determining unit 303 is used to determine multiple guardrail sample points based on the multi-sensor data and the traveling track. In this embodiment, the second determining unit 303 screens millimeter-wave radar data and visual sensor data from the multi-sensor data through a driving path, so that the guardrail sample points can be quickly obtained, and the calculation consumption is low.

In some embodiments, the second determining unit 303, based on the millimeter-wave radar data, determines a millimeter-wave radar target which is stationary and within a preset scope of the traveling track as a guardrail sample point. In some embodiments, taking 64 targets detectable by the millimeter-wave radar as an example, the second determining unit 303, based on the millimeter-wave radar data corresponding to each millimeter-wave radar target, judges whether each target satisfies that the target is stationary and within the preset scope of the traveling track; if yes, the target is determined as a guardrail sample point. In some embodiments, the preset scope of the traveling track may be a belt-shaped area distributed along the traveling track, and those skilled in the art can set the preset scope of the traveling track according to the actual needs.

In some embodiments, the second determining unit 303, based on the visual sensor data, determines a boundary point of a travelable area, which is classified as a guardrail and is within the preset scope of the traveling track, as a guardrail sample point. In some embodiments, the second determining unit 303 judges whether all millimeter-wave radar targets are guardrail sample points first, and then judges all boundary points of the travelable area. Specifically, the second determining unit 303 judges whether each boundary point of the travelable area satisfies that the category is a guardrail and the boundary point is within the preset scope of the traveling track; if yes, the boundary point of the travelable area is determined as a guardrail sample point.

In some embodiments, the second determining unit 303, based on the ultrasonic radar data, determines an ultrasonic target with valid ultrasonic radar data and a lateral range within a preset lateral range scope as a guardrail sample point. In some embodiments, the second determining unit 303, based on a receiving flag bit in the ultrasonic radar data, judges whether the receiving flag bit indicates that data has been received all the time; if not, determines that the ultrasonic radar data is invalid; and secondly, based on detection range limitation of the ultrasonic radar, determining ultrasonic radar data with a lateral range within the preset lateral range scope to be valid. Those skilled in the art can set the lateral range scope based on actual needs, and this embodiment does not limit the specific value of the lateral range scope.

In some embodiments, the second determining unit 303 judges whether all the boundary points of the travelable area are guardrail sample points, and then judges all ultrasonic radar targets. Specifically, the second determining unit 303, based on the ultrasonic radar data corresponding to each ultrasonic radar target, judges whether each ultrasonic radar target satisfies that the ultrasonic radar data is valid and the lateral range is within the preset lateral range scope; if yes, the ultrasonic target is determined as a guardrail sample point.

Figure 7:
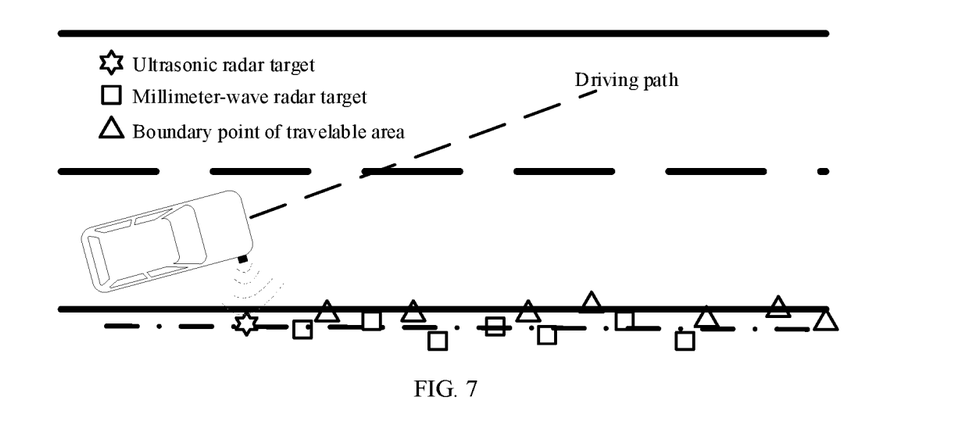
FIG. 7 is a scene in which a shape of a traveling track and a road boundary are inconsistent, provided by an embodiment of the present disclosure.

In some embodiments, for a scene where the traveling track is inconsistent with a shape of a road boundary, such as a scene where the vehicle changes lanes or turns into a corner, the way of screening the guardrail sample points through the driving path cannot effectively screen out suitable and sufficient guardrail sample points. As shown in FIG. 7, the vehicle is changing lanes, and the traveling track of the vehicle is inconsistent with the shape of the road boundary. In FIG. 7, a dash-dot line indicates a guardrail boundary fitted in last period, and the millimeter-wave radar target and the boundary point of the travelable area shown in FIG. 7 are all near the guardrail boundary fitted in last period, and may be used as guardrail sample points to ensure the effectiveness of guardrail tracing.

Therefore, in this embodiment, based on screening the guardrail sample points through the driving path, the second determining unit 303 screens the millimeter-wave radar data and the visual sensor data again through the guardrail information estimated in last period. It should be noted that the screening again is aimed at targets that are not screened as valid sample points (including the millimeter-wave radar targets and the boundary point of the travelable area), so as to supplement more guardrail sample points.

In some embodiments, the second determining unit 303 determines the multiple guardrail sample points based on the multi-sensor data and the traveling track, and then further screens multiple valid sample points from the multi-sensor data based on the guardrail information estimated in last period; and then, the estimation unit 304 estimates the guardrail information based on the guardrail sample points and the multiple valid sample points, that is, the multiple valid sample points are also regarded as the guardrail sample points, and participate in the estimation of the guardrail information together with the guardrail sample points.

In some embodiments, the second determining unit 303, based on the guardrail information estimated in last period, screens the multiple valid sample points in the multi-sensor data, including: based on the millimeter-wave radar data, determining a millimeter-wave radar target which is stationary and within the preset scope of the guardrail boundary estimated in last period and is not a guardrail sample point, as a valid sample point. In some embodiments, taking 64 targets detectable by the millimeter-wave radar as an example, the second determining unit 303, based on the millimeter-wave radar data corresponding to each target, judges whether each target satisfies that the target is stationary and within the preset scope of the guardrail boundary estimated in last period and is not a guardrail sample point; if yes, the target is determined as a valid sample point. For example, the millimeter-wave radar target shown in FIG. 7 is a valid sample point screened by the second determining unit 303 based on the guardrail information estimated in last period. It should be noted that those skilled in the art may set the preset scope of the guardrail boundary according to actual needs. This embodiment does not limit the specific value of the preset scope of the guardrail boundary.

In some embodiments, the second determining unit 303, based on the guardrail information estimated in last period, screens the multiple valid sample points in the multi-sensor data, including: based on the visual sensor data, determining a boundary point of a travelable area, which is classified as a guardrail and within the preset scope of the guardrail boundary estimated in last period and is not a guardrail sample point, as a valid sample point.

In some embodiments, the second determining unit 303 judges whether all millimeter-wave radar targets are guardrail sample points based on the guardrail information estimated in last period, and then judges all the boundary points of the travelable area based on the guardrail information estimated in last period. Specifically, the second determining unit 303 judges whether each boundary point of the travelable area satisfies that the boundary point of the travelable area is classified as a guardrail and within the preset scope of the guardrail boundary estimated in last period and is not a guardrail sample point; if yes, the boundary point of the travelable area is determined as a valid sample point. For example, the boundary point of the travelable area shown in FIG. 7 is a valid sample point screened by the second determining unit 303 based on the guardrail information estimated in last period.

The estimation unit 304 is used to estimate the guardrail information based on the multiple guardrail sample points. In some embodiments, the guardrail information may include, but is not limited to: a guardrail function coefficient, guardrail fitting reliability, a flag bit and longitudinal distance distribution. The flag bit is used to mark whether there is guardrail information.

In some embodiments, the estimation unit 304 determines a number and longitudinal range distribution of the multiple guardrail sample points; then, determines the guardrail fitting reliability based on the number and the longitudinal range distribution of the multiple guardrail sample points, and thus, determines the guardrail function coefficient based on the guardrail fitting reliability.

In some embodiments, the estimation unit 304 determines the guardrail fitting reliability based on the number and the longitudinal range distribution of the multiple guardrail sample points, particularly including: if the number of multiple guardrail sample points is greater than a preset sample point threshold and the longitudinal range distribution is greater than a preset value, it is considered that the guardrail fitting reliability is high, and the guardrail fitting reliability of last period may be increased to obtain the guardrail fitting reliability of this period, and the increased amount may be set according to the actual needs. It should be noted that the sample point threshold and the preset value may be set based on the actual situations, the specific values of which are not limited in this embodiment.

In some embodiments, the estimation unit 304 determines the guardrail function coefficient based on the guardrail fitting reliability, particularly including: judging whether the guardrail fitting reliability is greater than a preset reliability threshold; and based on the judgment result, determining the guardrail function coefficient.

In some embodiments, the estimation unit 304 fits multiple guardrail sample points to obtain fitting coefficients in the case that the guardrail fitting reliability is greater than the preset reliability threshold. In some embodiments, after determining the multiple guardrail sample points, the estimation unit 304 further determines a weight of each guardrail sample point, and then, in the case that the guardrail fitting reliability is greater than the preset reliability threshold, weighting and fitting the multiple guardrail sample points to obtain the fitting coefficients based on the weight of each guardrail sample point.

In some embodiments, after screening the multiple valid sample points, the estimation unit 304 further determines the weight of each guardrail sample point and the weight of each valid sample point; and then, in the case that the guardrail fitting reliability is greater than the preset reliability threshold, weighing and fitting the multiple guardrail sample points and the multiple valid sample points to obtain the fitting coefficients based on the weight of each guardrail sample point and the weight of each valid sample point.

In some embodiments, the estimation unit 304 fits the multiple guardrail sample points to obtain the fitting coefficients in two cases. In the first case, if a number of the multiple guardrail sample points is less than a preset number or the longitudinal range distribution is less than a preset value, the estimation unit 304 performs first-order fitting on the multiple guardrail sample points to obtain a first-order fitting coefficient. In the second case, if the number of the multiple guardrail sample points is no less than the preset number and the longitudinal range distribution is no less than the preset value, the estimation unit 304 performs second-order fitting on the multiple guardrail sample points to obtain a second-order fitting coefficient.

In some embodiments, the guardrail sample point and the valid sample points are collectively referred to as guardrail measuring points, and a weighted least square method is used to fit the guardrail measuring points. The weighted least square method needs to define a weight of each guardrail measuring points, and then form a weight matrix W. The weight matrix W may be defined as a covariance matrix composed of measuring point vectors. In some embodiments, the weight of the guardrail measuring point may be defined as an inverse of a lateral detection range variance of the guardrail measuring point.

In some embodiments, a linear expression of the first-order fitting is:

$$y = a + b \cdot x$$

The guardrail measuring points are denoted with $(x_1, y_1)$, $(x_2, y_2)$, . . . , $(x_n, y_n)$, wherein n represents the number of the guardrail measuring points.

Let $d_i$ be a range between an $i^{th}$ guardrail measuring point and the fitted straight line, then an expression of $d_i$ is as follows:

$$d_i = [y_i - (a + b \cdot x_i)]$$

Let D be a weighted sum of squares of deviations and a weight of an $i^{th}$ group of guardrail measuring points is $W_i$, there is the following formula:

$$D = \sum_{i=1}^{n} d_i^2 = \sum_{i=1}^{n} W_i \cdot [y_i - a - bx_i]^2$$

According to the partial derivative of D being 0, there are the following formulae:

$$\frac{\partial D}{\partial a} = -2 \cdot \sum_{i=1}^{n} W_i(y_i - a - b \cdot x_i) = 0$$

$$\frac{\partial D}{\partial b} = -2 \cdot \sum_{i=1}^{n} x_i \cdot W_i(y_i - a - b \cdot x_i) = 0$$

By solving the above formulae, the following may be got:

$$a = \frac{\sum W_i \cdot y_i - b \sum W_i \cdot x_i}{\sum W_i}$$

a is solved and substituted into the formula to get b.

In some embodiments, a curve expression of the second-order fitting is:

$$y = a + b \cdot x + c \cdot x^2$$

In some embodiments, the estimation unit 304 fits the multiple guardrail sample points to obtain the fitting coefficients, and then further filters the fitting coefficients to obtain the guardrail function coefficient. In some embodiments, the filtering processing is Kalman filtering. The filtering processing can smooth the fitting coefficient, prevent abnormal jump and increase the stability of guardrail tracing.

In some embodiments, the estimation unit 304 determines the guardrail function coefficient based on the guardrail fitting reliability, particularly including: in the case that the guardrail fitting reliability is no more than the preset reliability threshold, the estimation unit 304 filters based on motion state information of the vehicle to obtain the guardrail function coefficient. In some embodiments, the filtering processing is Kalman filtering. As the guardrail fitting reliability is no more than the reliability threshold, it means that no guardrail is detected. By filtering the motion state information of the vehicle, the guardrail function coefficient can be obtained, which ensures the correctness of guardrail tracing in a certain time. When the guardrail fitting reliability is greater than the guardrail reliability threshold, it is considered that the guardrail does not exist, and the filtering processing is stopped.

In some embodiments, state equations of the Kalman filtering are as follows:

$$a_{k+1}=a_k+w_k \cdot \Delta T$$

$$b_{k+1}=b_k+v_k \cdot a_k \cdot \Delta T$$

$$w_{k+1}=w_k$$

$$v_{k+1}=v_k$$

The subscript k represents a $k^{th}$ calculation period, $\Delta T$ represents a time interval between two calculations, a guardrail function coefficient a corresponds to a slope, the slope corresponds to a tangent of a heading angle, a change rate of the heading angle is a yaw rate when the guardrail is a straight line, and is denoted with w, a parameter b corresponds to an intercept, and a change rate of the intercept is a longitudinal speed along a direction of the vehicle vertical to the guardrail without considering a lateral speed, and it is considered that the vehicle speed and the yaw rate are unchanged in a very short time.

In some embodiments, the division of each unit in the guardrail estimation module 300 is only a logical function division, and there may be other division modes in actual implementation. For example, the acquisition unit 301, the first determining unit 302, the second determining unit 303 and the estimation unit 304 may be realized as one unit; the acquisition unit 301, the first determining unit 302, the second determining unit 303 or the estimation unit 304 may also be divided into a plurality of subunits. It may be understood that each unit or sub-unit can be realized by electronic hardware or a combination of computer software and electronic hardware. Whether the functions are executed by hardware or software depends on particular applications and design constraint conditions of the technical solutions. Those skilled in the art can use different methods for each specific application to realize the described functions.

Figure 4:
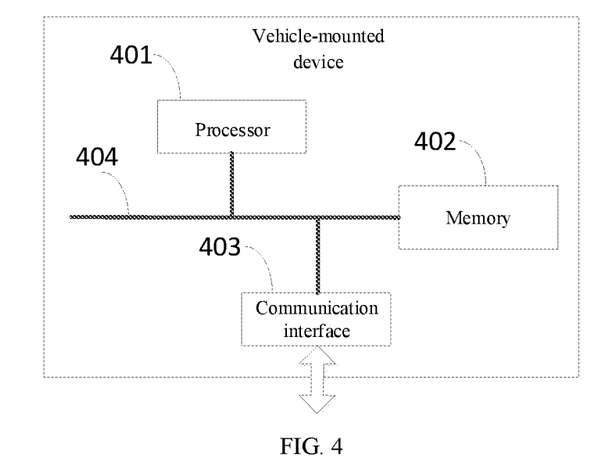
FIG. 4 is a block diagram of a vehicle-mounted device provided by an embodiment of the present disclosure.

FIG. 4 is a schematic structural diagram of a vehicle-mounted device provided by an embodiment of the present disclosure. The vehicle-mounted device may support the operation of a smart driving system.

As shown in FIG. 4, the vehicle-mounted device includes: at least one processor 401, at least one memory 402 and at least one communication interface 403. Various components in the vehicle-mounted device are coupled together through a bus system 404. The communication interface 403 is used for information transfer with external devices. It can be understood that the bus system 404 is configured to realize communications between these components. The bus system 404 includes a power bus, a control bus, and a status signal bus in addition to a data bus. However, for the sake of clarity, various buses are designated as the bus system 404 in FIG. 4.

It can be understood that the memory 402 in this embodiment may be a volatile memory or a non-volatile memory, or may include both volatile and non-volatile memories.

In some embodiments, the memory 402 is stored with the following elements, executable modules or data structures, or subsets thereof, or their extensions: an operating system and an application program.

The operating system includes various system programs, such as a framework layer, a core library layer, a driver layer, and the like, which are used to realize various basic services and handle hardware-based tasks. The application program may include various application programs, such as a Media Player, a Browser (Browser), and the like, for implementing various application services. The program for implementing the guardrail estimation method based on multi-sensor data fusion provided by an embodiment of the present disclosure may be included in the application program.

In the embodiment of the present disclosure, the processor 401 is used to execute the steps of each embodiment of the guardrail estimation method based on multi-sensor data fusion provided by an embodiment of the present disclosure by calling a program or instruction stored in the memory 402, specifically, a program or instruction stored in the application program.

The guardrail estimation method based on multi-sensor data fusion provided by an embodiment of the present disclosure may be applied to the processor 401, or implemented by the processor 401. The processor 401 may be an integrated circuit chip with a signal processing capacity. In an implementation process, the steps in the foregoing methods may be completed using an integrated logic circuit of hardware in the processor 401 or an instruction in a form of software. The above processor 401 may be a general-purpose processor, a Digital Signal Processor (DSP), an Application Specific Integrated Circuit (ASIC), a Field-Programmable Gate Array (FPGA) or other programmable logic device, a discrete gate, or a transistor logic device, and a discrete hardware assembly. The general-purpose processor may be a microprocessor or the processor may be any conventional processor, or the like.

The steps of the guardrail estimation method based on multi-sensor data fusion provided by an embodiment of the present disclosure may be directly executed and accomplished by means of a hardware decoding processor or may be executed and accomplished using a combination of hardware and software units in the decoding processor. The software unit may be located in a mature storage medium in the art, such as a random access memory, a flash memory, a read-only memory, a programmable read-only memory, or an electrically erasable programmable memory, a register, and the like. The storage medium is located in the memory 402. The processor 401 reads information from the memory 402 and completes the steps of the foregoing method in combination with the hardware of the processor.

Figure 5:
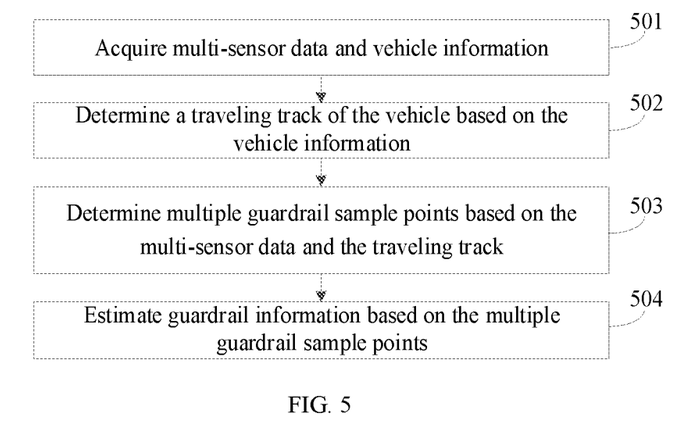
FIG. 5 is a flowchart of a guardrail estimation method based on multi-sensor data fusion provided by an embodiment of the present disclosure.

FIG. 5 is a flowchart of a guardrail estimation method based on multi-sensor data fusion provided by an embodiment of the present disclosure. An executing body of the method is a vehicle-mounted device, and in some embodiments, the executing body of the method is a smart driving system supported by the vehicle-mounted device.

As shown in FIG. 5, the guardrail estimation method based on multi-sensor data fusion may include the following steps 501 to 504.

At 501, multi-sensor data and vehicle information are acquired. In some embodiments, multiple sensors are arranged on the vehicle, which are at least used for realizing forward detection and lateral detection of the vehicle.

In some embodiments, the multi-sensors may include, but are not limited to: a Millimeter-Wave Radar, a visual sensor and an Ultrasonic Radar. The visual sensor is, for example, a Camera. The millimeter-wave radar and the visual sensor realize the forward detection, while the ultrasonic radar realizes the lateral detection of the vehicle.

In some embodiments, the multi-sensor arrangement is shown in FIG. 6. In FIG. 6, the Millimeter-Wave Radar is arranged on a front bumper of the vehicle, the Camera is arranged directly above a front windshield of the vehicle, and the Ultrasonic Radar is arranged on a right front side of the vehicle. Those skilled in the art can understand that the arrangement of the multi-sensors is not limited to the arrangement shown in FIG. 6, and there may be other ways, for example, the Ultrasonic Radar is also arranged on a left front side of the vehicle. This embodiment does not limit the specific arrangements of the multi-sensors, nor the specific installation positions of the multi-sensors, nor the specific types of the multi-sensors.

In some embodiments, the millimeter-wave radar data at least includes point information or track information of a moving object or a stationary object, wherein the point information at least includes a range, an azimuth, a detection range rate and a radar cross section of a detection target. The track information at least includes a Range, a Range Rate, an Angle and a Radar Cross Section (RCS).

In some embodiments, the visual sensor data is at least used to identify a travelable area, and then a boundary point of the travelable area can be determined, so as to obtain position information and category information of the boundary point of the travelable area. The position information includes a horizontal position and a longitudinal position. The horizontal direction may be understood as a horizontal direction of the vehicle, and the longitudinal direction may be understood as a longitudinal direction of the vehicle. The category information includes: guardrail and non-guardrail.

In some embodiments, the ultrasonic radar data at least includes a range of the nearest target detected. In the case that a relative speed is less than or equal to 80 kilometers per hour, guardrails within 3 meters can be detected.

In some embodiments, the vehicle information is at least used to calculate the traveling track of the vehicle and guardrail tracing. In some embodiments, the vehicle information may include, but is not limited to: a vehicle speed, a yaw rate and a steering wheel angle.

At 502, a traveling track of the vehicle is determined based on the vehicle information. In some embodiments, a steering radius of the vehicle is determined based on the vehicle information; and then, the traveling track of the vehicle is determined based on the steering radius. In some embodiments, the steering radius of the vehicle is calculated in two cases: calculating based on the steering wheel angle and a predetermined vehicle tread at a low speed; and calculating based on the vehicle speed and the yaw rate at a high speed. In some embodiments, if the vehicle speed is less than a preset vehicle speed, the steering radius of the vehicle is determined based on the steering wheel angle and a vehicle tread; and if the vehicle speed is not less than the preset vehicle speed, the steering radius of the vehicle is determined based on the vehicle speed and the yaw rate.

In some embodiments, if the vehicle speed is not less than the preset vehicle speed, the steering radius of the vehicle is calculated through the following formula:

$$R = \frac{v_x}{\omega}$$

$$v_x \geq v_{th}$$

If the vehicle speed is less than the preset vehicle speed, the steering radius of the vehicle is calculated through the following formula:

$$R = \frac{L}{\sin(\delta_f)}$$

$$v_x < v_{th}$$

wherein, $v_x$ is the vehicle speed, which may also be understood as a longitudinal speed of the vehicle, in the unit of meters per second (m/s); $\omega$ is the yaw rate, in the unit of rad/s; R is the steering radius of the vehicle, which may also be understood as a transient steering radius of the vehicle; L is the vehicle tread; $\delta_f$ is the front wheel angle, and the front wheel angle is calculated based on the steering wheel angle; $v_{th}$ is the preset vehicle speed, and those skilled in the art may set $v_{th}$ according to actual needs. This embodiment does not limit the specific value of $v_{th}$.

At 503, multiple guardrail sample points are determined based on the multi-sensor data and the traveling track. In this embodiment, the millimeter-wave radar data and visual sensor data are screened from the multi-sensor data through a driving path, so that the guardrail sample points can be quickly obtained, and the calculation consumption is low.

In some embodiments, based on the millimeter-wave radar data, a millimeter-wave radar target which is stationary and within a preset scope of the traveling track, is determined as a guardrail sample point. In some embodiments, taking 64 targets detectable by the millimeter-wave radar as an example, based on the millimeter-wave radar data corresponding to each millimeter-wave radar target, each target is judged whether to satisfy that the target is stationary and within the preset scope of the traveling track; if yes, the target is determined as a guardrail sample point. In some embodiments, the preset scope of the traveling track may be a belt-shaped area distributed along the traveling track, and those skilled in the art can set the preset scope of the traveling track according to the actual needs.

In some embodiments, based on the visual sensor data, a boundary point of a travelable area, which is classified as a guardrail and is within the preset scope of the traveling track, is determined as a guardrail sample point. In some embodiments, all millimeter-wave radar targets are judged whether to be guardrail sample points first, and then all boundary points of the travelable area are judged. Specifically, each boundary point of the travelable area is judged whether to satisfy that the category is a guardrail and the boundary point of the travelable area is within the preset scope of the traveling track; if yes, the boundary point of the travelable area is determined as a guardrail sample point.

In some embodiments, based on the ultrasonic radar data, an ultrasonic target with valid ultrasonic radar data and a lateral distance within a preset lateral distance range is determined as a guardrail sample point. In some embodiments, based on a receiving flag bit in the ultrasonic radar data, it is judged whether the receiving flag bit indicates that data has been received all the time; if not, the ultrasonic radar data is determined to be invalid; and secondly, based on detection range limitation of the ultrasonic radar, ultrasonic radar data with a lateral detection range within the preset lateral range scope is determined to be valid. Those skilled in the art can set the lateral range scope based on actual needs, and this embodiment does not limit the specific value of the lateral range scope.

In some embodiments, after judging whether all the boundary points of the travelable area are guardrail sample points, all ultrasonic radar targets are judged. Specifically, based on the ultrasonic radar data corresponding to each ultrasonic radar target, each ultrasonic radar target is judged whether to satisfy that the ultrasonic radar data is valid and the lateral range is within the preset lateral range scope; if yes, the ultrasonic target is determined as a guardrail sample point.

In some embodiments, for a scene where the traveling track is inconsistent with a shape of a road boundary, such as a scene where the vehicle changes lanes or turns into a corner, the way of screening the guardrail sample points through the driving path cannot effectively screen out suitable and sufficient guardrail sample points. As shown in FIG. 7, the vehicle is changing lanes, and the traveling track of the vehicle is inconsistent with the shape of the road boundary. In FIG. 7, a dash-dot line indicates a guardrail boundary fitted in last period, and the millimeter-wave radar target and the boundary point of the travelable area shown in FIG. 7 are all near the guardrail boundary fitted in last period, and may be used as guardrail sample points to ensure the effectiveness of guardrail tracing.

Therefore, in this embodiment, based on screening the guardrail sample points through the driving path, the millimeter-wave radar data and the visual sensor data are screened again through the guardrail information estimated in last period. It should be noted that the screening again is aimed at targets that are not screened as valid sample points (including the millimeter-wave radar targets and the boundary point of the travelable area), so as to supplement more guardrail sample points.

In some embodiments, after determining the multiple guardrail sample points based on the multi-sensor data and the traveling track, multiple valid sample points are further screened from the multi-sensor data based on the guardrail information estimated in last period; and then, the guardrail information is estimated based on the guardrail sample points and the multiple valid sample points, that is, the multiple valid sample points are also regarded as the guardrail sample points, and participate in the estimation of the guardrail information together with the guardrail sample points.

In some embodiments, the screening the multiple valid sample points from the multi-sensor data based on the guardrail information estimated in last period, includes: based on the millimeter-wave radar data, determining a millimeter-wave radar target which is stationary and within the preset scope of the guardrail boundary estimated in last period and is not a guardrail sample point, as a valid sample point. In some embodiments, taking 64 targets detectable by the millimeter-wave radar as an example, based on the millimeter-wave radar data corresponding to each target, each target is judged whether to satisfy that the target is stationary and within the preset scope of the guardrail boundary estimated in last period and is not a guardrail sample point; if yes, the target is determined as a valid sample point. For example, the millimeter-wave radar target shown in FIG. 7 is a valid sample point screened based on the guardrail information estimated in last period. It should be noted that those skilled in the art may set the preset scope of the guardrail boundary according to actual needs. This embodiment does not limit the specific value of the preset scope of the guardrail boundary.

In some embodiments, the screening the multiple valid sample points from the multi-sensor data based on the guardrail information estimated in last period, includes: based on the visual sensor data, determining a boundary point of a travelable area, which is classified as a guardrail and within the preset scope of the guardrail boundary estimated in last period and is not a guardrail sample point, as a valid sample point.

In some embodiments, after judging whether all millimeter-wave radar targets are guardrail sample points based on the guardrail information estimated in last period, all the boundary points of the travelable area are judged based on the guardrail information estimated in last period. Specifically, each boundary point of the travelable area is judged whether to satisfy that the boundary point of the travelable area is classified as a guardrail and within the preset scope of the guardrail boundary estimated in last period and is not a guardrail sample point; if yes, the boundary point of the travelable area is determined as a valid sample point. For example, the boundary point of the travelable area shown in FIG. 7 is a valid sample point screened based on the guardrail information estimated in last period.

At 504, guardrail information is estimated based on the multiple guardrail sample points. In some embodiments, the guardrail information may include, but is not limited to: a guardrail function coefficient, guardrail fitting reliability, a flag bit and longitudinal distance distribution. The flag bit is used to mark whether there is guardrail information.

In some embodiments, a number and longitudinal distance distribution of the multiple guardrail sample points are determined; then, the guardrail fitting reliability is determined based on the number and the longitudinal range distribution of the multiple guardrail sample points, and thus, the guardrail function coefficient is determined based on the guardrail fitting reliability.

In some embodiments, the determining the guardrail fitting reliability based on the number and the longitudinal range distribution of the multiple guardrail sample points, particularly includes: if the number of multiple guardrail sample points is greater than a preset sample point threshold and the longitudinal range distribution is greater than a preset value, it is considered that the guardrail fitting reliability is high, and the guardrail fitting reliability of last period may be increased to obtain the guardrail fitting reliability of this period, and the increased amount may be set according to the actual needs. It should be noted that the sample point threshold and the preset value may be set based on the actual situations, the specific values of which are not limited in this embodiment.

In some embodiments, the determining the guardrail function coefficient based on the guardrail fitting reliability, particularly includes: judging whether the guardrail fitting reliability is greater than a preset reliability threshold; and based on the judgment result, determining the guardrail function coefficient.

In some embodiments, the multiple guardrail sample points are fit to obtain fitting coefficients in the case that the guardrail fitting reliability is greater than the preset reliability threshold. In some embodiments, after determining the multiple guardrail sample points, a weight of each guardrail sample point is further determined, and then, in the case that the guardrail fitting reliability is greater than the preset reliability threshold, the multiple guardrail sample points are weighted and fitted to obtain the fitting coefficients based on the weight of each guardrail sample point.

In some embodiments, after screening the multiple valid sample points, the weight of each guardrail sample point and the weight of each valid sample point are further determined; and then, in the case that the guardrail fitting reliability is greater than the preset reliability threshold, the multiple guardrail sample points and the multiple valid sample points are weighted and fitted to obtain the fitting coefficients based on the weight of each guardrail sample point and the weight of each valid sample point.

In some embodiments, the multiple guardrail sample points are fitted to obtain the fitting coefficients in two cases. In the first case, if a number of the multiple guardrail sample points is less than a preset number or the longitudinal range distribution is less than a preset value, first-order fitting is performed on the multiple guardrail sample points to obtain a first-order fitting coefficient. In the second case, if the number of the multiple guardrail sample points is no less than the preset number and the longitudinal range distribution is no less than the preset value, second-order fitting is performed on the multiple guardrail sample points to obtain a second-order fitting coefficient.

In some embodiments, the guardrail sample point and the valid sample points are collectively referred to as guardrail measuring points, and a weighted least square method is used to fit the guardrail measuring points. The weighted least square method needs to define a weight of each guardrail measuring points, and then form a weight matrix W. The weight matrix W may be defined as a covariance matrix composed of measuring point vectors. In some embodiments, the weight of the guardrail measuring point may be defined as an inverse of a lateral detection range variance of the guardrail measuring point.

In some embodiments, a linear expression of the first-order fitting is:

$$y = a + b \cdot x$$

The guardrail measuring points are denoted with $(x_1, y_1)$, $(x_2, y_2)$, ..., $(x_n, y_n)$, wherein n represents the number of the guardrail measuring points.

Let $d_i$ be a range between an $i^{th}$ guardrail measuring point and the fitted straight line, then an expression of $d_i$ is as follows:

$$d_i = [y_i - (a + b \cdot x_i)]$$

Let D be a weighted sum of squares of deviations and a weight of an $i^{th}$ group of guardrail measuring points is $W_i$, there is the following formula:

$$D = \sum_{i=1}^{n} d_i^2 = \sum_{i=1}^{n} W_i \cdot [y_i - a - b x_i]^2$$

According to the partial derivative of D being 0, there are the following formulae:

$$\frac{\partial D}{\partial a} = -2 \cdot \sum_{i=1}^{n} W_i(y_i - a - b \cdot x_i) = 0$$

$$\frac{\partial D}{\partial b} = -2 \cdot \sum_{i=1}^{n} x_i \cdot W_i(y_i - a - b \cdot x_i) = 0$$

By solving the above formulae, the following may be got:

$$a = \frac{\sum W_i \cdot y_i - b \sum W_i \cdot x_i}{\sum W_i}$$

a is solved and substituted into the formula to get b.

In some embodiments, a curve expression of the second-order fitting is:

$$y = a + b \cdot x + c \cdot x^2$$

In some embodiments, after fitting the multiple guardrail sample points to obtain the fitting coefficients, the fitting coefficients are further filtered to obtain the guardrail function coefficient. In some embodiments, the filtering processing is Kalman filtering. The filtering processing can smooth the fitting coefficient, prevent abnormal jump and increase the stability of guardrail tracing.

In some embodiments, the determining the guardrail function coefficient based on the guardrail fitting reliability, particularly includes: in the case that the guardrail fitting reliability is no more than the preset reliability threshold, filtering based on motion state information of the vehicle to obtain the guardrail function coefficient. In some embodiments, the filtering processing is Kalman filtering. As the guardrail fitting reliability is no more than the reliability threshold, it means that no guardrail is detected. By filtering the motion state information of the vehicle, the guardrail function coefficient can be obtained, which ensures the correctness of guardrail tracing in a certain time. When the guardrail fitting reliability is greater than the guardrail reliability threshold, it is considered that the guardrail does not exist, and the filtering processing is stopped.

In some embodiments, state equations of the Kalman filtering are as follows:

$$a_{k+1} = a_k + w_k \cdot \Delta T$$

$$b_{k+1} = b_k + v_k \cdot a_k \cdot \Delta T$$

$$w_{k+1} = w_k$$

$$v_{k+1} = v_k$$

The subscript k represents a $k^{th}$ calculation period, $\Delta T$ represents a time interval between two calculations, a guardrail function coefficient a corresponds to a slope, the slope corresponds to a tangent of a heading angle, a change rate of the heading angle is a yaw rate when the guardrail is a straight line, and is denoted with w, a parameter b corresponds to an intercept, and a change rate of the intercept is a longitudinal speed along a direction of the vehicle vertical to the guardrail without considering a lateral speed, and it is considered that the vehicle speed and the yaw rate are unchanged in a very short time.

It should be noted that, for the sake of simple description, the foregoing method embodiments are all expressed as a series of action combinations, but those skilled in the art can understand that the embodiments of the present disclosure are not limited by the described action sequences, because certain steps may be performed in other sequences or concurrently according to the embodiments of the present application. Moreover, those skilled in the art can understand that the embodiments described in the specification are all optional embodiments.

The embodiments of the present disclosure also provide a non-transient computer-readable storage medium, which stores programs or instructions, and the programs or instructions cause a computer to execute the steps of the various embodiments of the guardrail estimation method based on multi-sensor data fusion, which will not be repeated here to avoid repeated descriptions.

It should be noted that the terms "including", "comprising" or any variations thereof are intended to embrace a non-exclusive inclusion, such that a process, a method, an article, or an apparatus including a series of elements, includes not only those elements but also includes other elements not expressly listed, or also incudes elements inherent to such process, method, article, or apparatus. In the absence of further limitation, an element defined by the phrase "including . . ." does not exclude the existence of additional identical elements in the process, method, article, or apparatus that includes the element.

Those skilled in the art can understand that although some embodiments described herein include some features included in other embodiments rather than other features, but combinations of features of different embodiments are meant to be within the scope of the present disclosure and form different embodiments.

Those skilled in the art can understand that the description of each embodiment has its own emphasis. For parts not detailed in one embodiment, please refer to the related description of other embodiments.

Although the embodiments of the present disclosure have been described with reference to the drawings, those skilled in the art can make various modifications and variations without departing from the spirit and scope of the present disclosure, and such modifications and variations all fall within the scope defined by the appended claims.

In the embodiments of the present disclosure, when the vehicle is controlled laterally, the guardrail information is used for correcting a lane line of poor quality; and when the lane line cannot be detected, the guardrail information is used for lateral control downgrade processing, and meanwhile, the guardrail information also facilitates aided realization of fast and accurate expressway lane-level localization, and realization of a higher-level aided driving function. The embodiments of the present disclosure have industrial applicability.

The invention claimed is:

1. A smart driving method based on a multi-sensor data fusion, comprising:
   acquiring multi-sensor data and vehicle information of a vehicle;
   determining a traveling track of the vehicle based on the vehicle information;
   determining multiple guardrail sample points based on the multi-sensor data and the traveling track;
   estimating guardrail information based on the multiple guardrail sample points; and
   controlling, by a processor, lateral movement of the vehicle by controlling steering of the vehicle based on the guardrail information;
   wherein
   the multi-sensor data comprises millimeter-wave radar data, visual sensor data, and ultrasonic radar data;
   the vehicle information comprises a vehicle speed, a yaw rate, and a steering wheel angle; and
   the guardrail information comprises a guardrail function coefficient, a guardrail fitting reliability, a flag bit, and a longitudinal range distribution, and
   wherein the determining the multiple guardrail sample points based on the multi-sensor data and the traveling track comprises:
      based on the millimeter-wave radar data, determining a millimeter-wave radar target as a first guardrail sample point, wherein the millimeter-wave radar target is stationary and within a preset scope of the traveling track;
      based on the visual sensor data, determining a boundary point of a travelable area as a second guardrail sample point, wherein the boundary point of the travelable area is classified as a guardrail and is within the preset scope of the traveling track; and
      based on the ultrasonic radar data, determining an ultrasonic target with valid ultrasonic radar data and a lateral range within a preset lateral range scope as a third guardrail sample point,
   wherein the estimating the guardrail information based on the multiple guardrail sample points comprises:
      determining a number and a longitudinal range distribution of the multiple guardrail sample points;
      based on the number and the longitudinal range distribution, determining the guardrail fitting reliability; and
      based on the guardrail fitting reliability, determining the guardrail function coefficient.

2. The guardrail estimation method according to claim 1, wherein determining the traveling track of the vehicle based on the vehicle information comprises:
   determining a steering radius of the vehicle based on the vehicle information; and
   determining the traveling track of the vehicle based on the steering radius.

3. The guardrail estimation method according to claim 2, wherein determining the steering radius of the vehicle based on the vehicle information comprises:
   in the case that the vehicle speed is less than a preset vehicle speed, determining the steering radius of the vehicle based on the steering wheel angle and a vehicle tread; and
   in the case that the vehicle speed is not less than the preset vehicle speed, determining the steering radius of the vehicle based on the vehicle speed and the yaw rate.

4. The guardrail estimation method according to claim 1, wherein determining the guardrail function coefficient based on the guardrail fitting reliability comprises:
   judging whether the guardrail fitting reliability is greater than a preset reliability threshold; and
   based on a judgment result, determining the guardrail function coefficient.

5. The guardrail estimation method according to claim 4, wherein the guardrail fitting reliability is greater than the preset reliability threshold, wherein determining the guardrail function coefficient based on the judgment result comprises:
   in the case that the guardrail fitting reliability is greater than the preset reliability threshold, fitting the multiple guardrail sample points to obtain fitting coefficients, and filtering the fitting coefficients to obtain the guardrail function coefficient.

6. The guardrail estimation method according to claim 5, wherein the fitting of the multiple guardrail sample points to obtain the fitting coefficients comprises:

in response to the number being less than a preset number or the longitudinal range distribution being less than a preset value, performing a first-order fitting on the multiple guardrail sample points to obtain a first-order fitting coefficient; or in response to the number being not less than the preset number and the longitudinal range distribution being not less than the preset value, performing a second-order fitting on the multiple guardrail sample points to obtain a second-order fitting coefficient.

7. The guardrail estimation method according to claim 5, wherein after determining the multiple guardrail sample points, the guardrail estimation method further comprises:
determining a weight of each guardrail sample point; and
based on the weight of each guardrail sample point, weighting and fitting the multiple guardrail sample points to obtain the fitting coefficients.

8. The guardrail estimation method according to claim 4, wherein the guardrail fitting reliability is not more than the preset reliability threshold, wherein determining the guardrail function coefficient based on the judgment result comprises:
in the case that the guardrail fitting reliability is not more than the preset reliability threshold, filtering based on motion state information of the vehicle to obtain the guardrail function coefficient.

9. The guardrail estimation method according to claim 1, wherein after determining the multiple guardrail sample points based on the multi-sensor data and the traveling track, the guardrail estimation method further comprises:
based on the guardrail information estimated in a last period, screening multiple valid sample points in the multi-sensor data; and
based on the multiple guardrail sample points and the multiple valid sample points, estimating the guardrail information.

10. The guardrail estimation method according to claim 9, wherein the screening of the multiple valid sample points in the multi-sensor data based on the guardrail information estimated in the last period comprises:
based on the millimeter-wave radar data, determining a millimeter-wave radar target as a first valid sample point, wherein the millimeter-wave radar target is stationary and within the preset scope of the guardrail boundary estimated in the last period and is not a guardrail sample point; and
based on the visual sensor data, determining a boundary point of a travelable area as a second valid sample point, wherein the boundary point of the travelable area is classified as a guardrail and within the preset scope of the guardrail boundary estimated in the last period and is not a guardrail sample point.

11. The guardrail estimation method according to claim 9, wherein the guardrail estimation method further comprises:
determining a weight of each guardrail sample point and a weight of each valid sample point; and
based on the weight of each guardrail sample point and the weight of each valid sample point, weighting and fitting the multiple guardrail sample points and the multiple valid sample points to obtain fitting coefficients.

12. A vehicle-mounted device, comprising: a processor and a memory;
wherein the processor is configured to execute the following operations by calling a program or an instruction stored in the memory:
acquiring multi-sensor data and vehicle information of a vehicle;
determining a traveling track of the vehicle based on the vehicle information;
determining multiple guardrail sample points based on the multi-sensor data and the traveling track;
estimating guardrail information based on the multiple guardrail sample points; and
controlling lateral movement of the vehicle by controlling steering of the vehicle based on the guardrail information,
wherein
the multi-sensor data comprises millimeter-wave radar data, visual sensor data, and ultrasonic radar data;
the vehicle information comprises a vehicle speed, a yaw rate, and a steering wheel angle; and
the guardrail information comprises a guardrail function coefficient, a guardrail fitting reliability, a flag bit, and a longitudinal range distribution,
wherein the determining the multiple guardrail sample points based on the multi-sensor data and the traveling track comprises:
based on the millimeter-wave radar data, determining a millimeter-wave radar target as a first guardrail sample point, wherein the millimeter-wave radar target is stationary and within a preset scope of the traveling track;
based on the visual sensor data, determining a boundary point of a travelable area as a second guardrail sample point, wherein the boundary point of the travelable area is classified as a guardrail and is within the preset scope of the traveling track; and
based on the ultrasonic radar data, determining an ultrasonic target with valid ultrasonic radar data and a lateral range within a preset lateral range scope as a third guardrail sample point,
wherein the estimating the guardrail information based on the multiple guardrail sample points comprises:
determining a number and a longitudinal range distribution of the multiple guardrail sample points;
based on the number and the longitudinal range distribution, determining the guardrail fitting reliability; and
based on the guardrail fitting reliability, determining the guardrail function coefficient.

13. The vehicle-mounted device according to claim 12, wherein the determining of the traveling track of the vehicle based on the vehicle information comprises:
determining a steering radius of the vehicle based on the vehicle information; and
determining the traveling track of the vehicle based on the steering radius.

14. A non-transitory computer-readable storage medium, wherein a program or an instruction is stored in the non-transitory computer-readable storage medium, and the program or the instruction enables a computer to execute:
acquiring multi-sensor data and vehicle information of a vehicle;
determining a traveling track of the vehicle based on the vehicle information;
determining multiple guardrail sample points based on the multi-sensor data and the traveling track;
estimating guardrail information based on the multiple guardrail sample points; and
controlling lateral movement of the vehicle by controlling steering of the vehicle based on the guardrail information, wherein
the multi-sensor data comprises millimeter-wave radar data, visual sensor data, and ultrasonic radar data;
the vehicle information comprises a vehicle speed, a yaw rate, and a steering wheel angle; and
the guardrail information comprises a guardrail function coefficient, a guardrail fitting reliability, a flag bit, and a longitudinal range distribution,
wherein the determining the multiple guardrail sample points based on the multi-sensor data and the traveling track comprises:
  based on the millimeter-wave radar data, determining a millimeter-wave radar target as a first guardrail sample point, wherein the millimeter-wave radar target is stationary and within a preset scope of the traveling track;
  based on the visual sensor data, determining a boundary point of a travelable area as a second guardrail sample point, wherein the boundary point of the travelable area is classified as a guardrail and is within the preset scope of the traveling track; and
  based on the ultrasonic radar data, determining an ultrasonic target with valid ultrasonic radar data and a lateral range within a preset lateral range scope as a third guardrail sample point,
wherein the estimating the guardrail information based on the multiple guardrail sample points comprises:
  determining a number and a longitudinal range distribution of the multiple guardrail sample points;
  based on the number and the longitudinal range distribution, determining the guardrail fitting reliability; and
  based on the guardrail fitting reliability, determining the guardrail function coefficient.

15. The non-transitory computer-readable storage medium according to claim 14, wherein the determining of the traveling track of the vehicle based on the vehicle information comprises:
  determining a steering radius of the vehicle based on the vehicle information; and
  determining the traveling track of the vehicle based on the steering radius.

* * * * *